United States Patent [19]

Mabuchi et al.

[11] Patent Number: 4,572,871

[45] Date of Patent: Feb. 25, 1986

[54] GLASS-RUN FOR WINDOW GLASS OF MOTOR CAR

[75] Inventors: Akira Mabuchi; Kenji Yano, both of Aichi, Japan

[73] Assignee: Toyoda Gosei Co., Ltd., Nishikasugai, Japan

[21] Appl. No.: 664,030

[22] Filed: Oct. 23, 1984

[30] Foreign Application Priority Data

Oct. 27, 1983 [JP] Japan .................. 58-200084

[51] Int. Cl.⁴ ............................................. B32B 27/00
[52] U.S. Cl. .................... 428/423.1; 49/441; 427/385.5; 427/393.6; 428/424.2; 428/423.9; 524/507

[58] Field of Search ............... 524/269, 507, 731, 730, 524/788, 791, 875, 263, 265, 267; 49/374, 441; 296/146; 428/423.1, 424.2, 423.9; 427/393.6, 385.5

[56] References Cited

U.S. PATENT DOCUMENTS 2,840,416  6/1958  Woodward ..................... 49/441
4,289,813  9/1981  Blomeyer et al. .............. 427/385.5

*Primary Examiner*—Edith Buffalow
*Attorney, Agent, or Firm*—Cushman, Darby & Cushman

[57] ABSTRACT

A glass-run for a window glass moving to open and close of a motor car, which has excellent abrasion resistance, is disclosed, said glass-run comprising a substrate of a high molecular material having coated on the surface thereof a film formed by hardening a specific paint composition comprising components (A), (B), (C), (D) and (E) described in the specification.

2 Claims, No Drawings

GLASS-RUN FOR WINDOW GLASS OF MOTOR CAR

FIELD OF THE INVENTION

The present invention relates to a novel glass-run for a window glass of a motor car, more specifically to a glass-run for a window glass of a motor car, having improved abrasion resistance.

BACKGROUND OF THE INVENTION

Glass-run for a window glass of a motor car has been required various properties (such as high heat resistance and weather fastness) to be exhibited under severe conditions. In general, glass-run applied to the window of motor car, when it is used to support the window glass, especially in the case of a window glass moving to open and close, is required to be made of materials having a low coefficient of friction. The glass-run is used at the parts to be contacted with the movable glass, while a fixed window glass is supported by window flame per se, that is, by weather strips made of rubber or plastics. The glass-run is generally coated with a film at the parts to be contacted with the movable glass. However, an abrasion resistance test of such a conventional glass-run reveals that the coated film per se is easily abraded or cracked, or the coated film is often peeled apart from the substrate.

SUMMARY OF THE INVENTION

An object of this invention is to provide a glass-run for a window glass of a motor car, which has excellent abrasion resistance.

As a result of extensive studies on glass-run to improve its abrasion resistance, it has now been found that the coated film is the determinative factor on the abrasion resistance of glass-run and that the abrasion resistance can be markedly improved by coating a paint composition comprising the following components (A), (B), (C), (D) and (E) on at least a part of the surface of a substrate of glass-run to be contacted with the movable window glass, and hardening it.

That is, the present invention provides a glass-run for a window glass moving to open and close of a motor car, which comprises a substrate of a high molecular material having a film coated on at least a part of the surface of the substrate to be contacted with the window glass, said film being formed by hardening a paint composition comprising:

(A) 100 parts by weight of an urethane prepolymer obtained by the reaction of a polyester polyol having hydroxy groups in its terminal and a molecular weight of 1,000 to 3,000, synthesized from a saturated diol having 2 to 6 carbon atoms and an orgnaic dicarboxylic acid having 4 to 6 carbon atoms, with an organic diisocyanate in the molar ratio of NCO/OH of from 0.6/1 to 0.95/1;

(B) 10 to 60 parts by weight of a castor oil polyol;

(C) 1 to 100 parts by weight of an urethane prepolymer having isocyanate groups in its terminal obtained by the reaction of a low molecular polyol and an organic diisocyanate;

(D) 2 to 100 parts by weight a fluoro resin; and (E) 5 to 100 parts by weight of a silicone oil.

Furthermore, the present invention provides the glass-run wherein the paint composition further comprises (F) 0.5 to 3 parts by weight of talc.

DETAILED DESCRIPTION OF THE INVENTION

High molecular materials which can be used as a substrate of glass-run are not particularly limited, and any materials conventionally used as the substrate of glass-run can be used in the present invention. The surface of the substrate is coated with the paint composition of the present invention. The surface of the substrate is optionally cleaned up before coating the paint composition.

The urethane prepolymer (A) which is one of the components of the paint composition is obtained by the reaction of a polyester polyol and an organic diisocyanate in the molar ratio of NCO/OH of from 0.6/1 to 0.95/1. When the ratio is outside the above range, the resulting glass-run does not exhibit excellent abrasion resistance in a high temperature atmosphere.

The polyesterpolyol which constitutes the urethane prepolymer (A) has hydroxy groups in its terminal and a molecular weight of from 1,000 to 3,000 and is obtained by reacting a saturated diol having 2 to 6 carbon atoms and an organic dicarboxylic acid having 4 to 6 carbon atoms. Examples of saturated diols include propylene glycol, buthanediol, penthanediol, hexanediol and the like, and examples of organic dicarboxylic acids include adipic acid, succinic acid and the like.

Examples of orgnaic diisocyanates which constitutes the urethane prepolymer (A) include 4,4'-diphenylmethane diisocyanate, 4,4'-diphenyl ether diisocyanate and the like.

The castor oil polyol (B) is a copolymer composed of castor oil, phthalic anhydride and glycerol, and the molecular weight and number of OH groups of castor oil polyol may be changed by altering the molar ratio of the three monomer components. The number of OH group is generally more or less 100.

The urethane prepolymer (C) has isoyanate groups in its terminal and is obtained by reacting a low molecular polyol (generally a molecular weight of less than 1,000) and an organic diisocyanate. Examples of low molecular polyols include glycerine, trimethylol propane and the like. As the organic diisocyanate, those described in the preparation of the urethane prepolymer (A) can be used.

Examples of the fluoro resin (D) include 4-fluoroethylene resin, 4-fluoroethylene/6-fluoropropylene copolymer, 3-fluoro-chloro-ethylene resin, fluorovinlydene resin and the like.

Examples of the silicone oil (E) include dimethyl silicone oil, methyl chloro silicone oil, methyl hydrogen silicone oil, methyl phenyl silicone oil, fluoro silicone oil and the like.

In the paint composition used in the present invention, component (B) is used in an amount of 10 to 60 parts by weight per 100 parts by weight of component (A). When component (B) is used in an amount outside the above range, the abrasion resistance of the resulting glass-run is deteriorated. Component (D) is used in an amount of 2 to 100 parts by weight, preferably 10 to 60 parts by weight, per 100 parts by weight of component (A). The use of less than 2 parts by weight of component (D) results in deterioration of the abrasion resistance and the use of more than 100 parts by weight of component (D) degrades the stability of the paint composition and precipitations of component (D) occurs significantly. Component (E) is used in an amount of 5 to 100 parts by weight, preferably 10 to 50 parts by weight, per 100 parts by weight of component (A). When it is less than 5 parts by weight, the abrasion resistance of the resulting glass-run is degraded, and when it is more than 100 parts by weight, the resulting paint composition becomes unstable and component (E) is separated from the composition as well as in the case of component (D).

In the preparation of the paint composition, a catalyst capable of accelating the urethanizating reaction may also be added, such as dibuthyltin diacetate, dibuthyltin dioctoate, dibuthyltin dilaurate, dibuthyltin diesterate, tributhyltin acetate, tributhyltin octoate, tributhyltin laurate, dioctyltin diacetate, dioctyltin dilaurate, diethyltin oleate, monomethyltin dioleate, etc. In addition, fillers such as carbon black, silicon dioxide etc. may further be added.

Organic solvents which can be used as a diluent for the paint composition include acetone, methyl ethylketone, methyl isobuthyl ketone, benzene, toluene, xylene, ethyl acetate, methyl acetate, isopropyl acetate, trichloroethylene, 1,1,1-trichloroethane, dimethylformamide etc. The amount of organic solvents may be selected in accordance with a desired viscosity of the composition used for proccessing.

As coating method for the paint composition used in the production of glass-run, dip coating method, spray coating method, brush coating method, knife coating, roller coating etc. can be used, but the coating method is not limited thereto. The paint composition is used in the form of a solution diluted with the organic solvent as described above. The paint ccmposition is coated on the substrate to form a firm generally having a dry thickness of from 10 to 100 $\mu$m and preferably from 30 to 50 $\mu$m.

The production of glass-run according to the present invention has an advantage that a film having excellent properties with respect to abrasion resistance, nonadhesion property, water-repellancy and lubricity can be formed on the substrate by a simple operation, i.e., merely by coating and allowing to stand at a room temperature for several hours or heating at 180° C. or the less for several minutes. The term "room temperature" herein means a normal temperature in the room affected from usual climate and without using heating means such as dryer and hearth. The coated film is preferably hardened at a room temperature since a heating apparatus is not required and the operation is simplified. However, heating means may be used when a great deal of the treatment is required. In the case, the temperature must be maintained below 180° C. because the heating at a temperature of more than 180° C. might deteriorate the substrate. Some kinds of substrate are softened at a temperature of more than 100° C., and therefore it is preferred to treat it by heating at a temperature of less than 100° C. The heating means may properly be selected.

The present invention will be described in more detail by reference to the following Examples. In the Examples, all parts are by weight, with regard to the substrates used in Examples, EPDM rubber (hardness JIS, A 80 degree) was used in Example 1–8 and an extruded product of a mixture of polyvinyl chloride (100 parts), dioctyl phtalate (75 parts), barium stearate (2 parts), zinc stearate (1 part) and dibuthyltin dilaurate (1 part) (the extrusion temperature: 130°–140° C.) was used in Example 9.

Urethane prepolymer (A) and urethane prepolymer (C) employed in Examples were prepared in the following manner.

Urethane prepolymer (A) having terminal hydroxy groups was obtained by reacting 1000 parts of polyester polyol(hydroxy group value: 56.0) synthetized from 1,4-buthanediol and adipic acid, and 100 parts of 4,4'-diphenylmethane diisocyanate (MDI), in 2000 parts of toluene under dryed nitrogen atmosphere at 80° C. for 3 hours.

Urethane prepolymer (C) having terminal NCO groups was obtained by reacting 100 parts of trimethylolpropane and 553 parts of 4,4'-diphenylmethane diisocyanate in 487 parts of ethyl acetate under dryed nitrogen atmosphere at 80° C. for 3 hours.

EXAMPLE 1

25.0 parts of urethane prepolymer (A), 3.5 parts of castor oil polyol ("2310-50T" made by Tokushima Seiyu Co., Ltd.), 10 parts of urethane prepolymer (C), 8.0 parts of 4-fluoroethylene resin, 8.0 parts of silicone oil, 0.5 part of carbon black, 0.065 part of dibuthyltin dilaurate, 0.065 part of phenol salt of 1,8-diazabicycloundecene-7, were mixed using a solvent consisting of 1.3 parts of toluene, 3.0 parts of cyclohexanone, 15.0 parts of tetrachloroethylene and 118.9 part of trichloroethylene, to prepare a paint composition. This paint composition was coated on a substrate and hardened to produce a glass-run for a window glass of motor car.

Abrasion resistance of the product was examined by an abrasion resistance test, and the results are shown in the Table.

ABRASION RESISTANCE TEST

The coated surface of the product was abraded by moving the glass abrasor (thickness: 5 mm) in reciprocal manner under the following cohditions.
Charged weight: 3 kg
Cycle of abrasor: 60 times/ minute
stroke of abrasor: 145 mm

EXAMPLES 2–9 AND COMPARATIVE EXAMPLES 1–2

Experiments were carried out in the same manner as in Example 1 except using the paint composition shown in the Table, and the results are also shown in the Table.

TABLE

|  | Comp. Ex. 1 | Comp. Ex. 2 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- |
| Urethane prepolymer (A) | 25.0 | 25.0 | 25.0 | 25.0 | 25.0 | 25.0 | 25.0 | 25.0 | 25.0 | 25.0 | 25.0 |
| Castor oil polyol (1) | — | — | 3.5 | 6.0 | 8.0 | 10.0 | — | — | 8.0 | 8.0 | 8.0 |
| Castor oil polyol (2) | — | — | — | — | — | — | 8.0 | — | — | — | — |
| Castor oil polyol (3) | — | — | — | — | — | — | — | 8.0 | — | — | — |
| Urethane prepolymer (C) | 14.0 | 14.0 | 10.0 | 10.0 | 10.0 | 10.0 | 14.0 | 10.0 | 10.0 | 10.0 | 10.0 |
| Fluoro resin | 8.0 | 8.0 | 8.0 | 8.0 | 8.0 | 8.0 | 8.0 | 8.0 | 8.0 | 8.0 | 8.0 |
| Silicone oil | 8.0 | 8.0 | 8.0 | 8.0 | 8.0 | 8.0 | 8.0 | 8.0 | 8.0 | 8.0 | 8.0 |
| Carbon black | 0.5 | 0.5 | 0.5 | 0.5 | 0.5 | 0.5 | 0.5 | 0.5 | 0.5 | 0.5 | 0.5 |
| Talc | — | 1.0 | — | — | — | — | — | — | 1.0 | 2.0 | — |

TABLE-continued

|  | Comp. Ex. 1 | Comp. Ex. 2 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- |
| DBTDL | 0.065 | 0.065 | 0.065 | 0.065 | 0.065 | 0.065 | 0.065 | 0.065 | 0.065 | 0.065 | 0.065 |
| SA No. 1 | 0.065 | 0.065 | 0.065 | 0.065 | 0.065 | 0.065 | 0.065 | 0.065 | 0.065 | 0.065 | 0.065 |
| Toluene | 1.3 | 1.3 | 1.3 | 1.3 | 1.3 | 1.3 | 1.3 | 1.3 | 1.3 | 1.3 | 1.3 |
| Cyclohexane | 3.0 | 3.0 | 3.0 | 3.0 | 3.0 | 3.0 | 3.0 | 3.0 | 3.0 | 3.0 | 3.0 |
| Tetrachloroethylene | 15.0 | 15.0 | 15.0 | 15.0 | 15.0 | 15.0 | 15.0 | 15.0 | 15.0 | 15.0 | 15.0 |
| Trichloroethylene | 118.9 | 118.9 | 118.9 | 118.9 | 118.9 | 118.9 | 118.9 | 118.9 | 118.9 | 118.9 | 118.9 |
| Abrasion resistance (time) | 5000 | 5000 | 10,000 | 20,000 | 25,000 | 10,000 | 10,000 | 15,000 | 45,000 | 30,000 | 50,000 |

[Notes]
Castor oil polyol (1): hydroxy group value, 80; "2310-50T" made by Tokushima Seiyu Co., Ltd. Japan
Castor oil polyol (2): hydroxy group value, 86; "2308-50T" made by Tokushima Seiyu Co., Ltd. Japan
Castor oil polyol (3): hydroxy group value, 92; "2311-60T" made by Tokushima Seiyu Co., Ltd. Japan
DBTDL: dibuthyltin dilaurate
SA No. 1: phenol salt of 1,8-diazabicycloundecene-7

It can be seen from the results that the glass-run of the present invention has markedly improved abrasion resistance.

While the invention has been described in detail and with reference to specific embodiments thereof, it will be apparent to one skilled in the art that various changes and modifications can be made therein without departing from the spirit and scope thereof.

What is claimed is:

1. A glass-run for a window glass moving to open and close of a motor car, which comprises a substrate material having a film coated on at least a part of the surface of the substrate to be contacted with the window glass, said film being formed by hardening a paint composition comprising:

(A) 100 parts by weight of an urethane prepolymer obtained by the reaction of a polyester polyol having hydroxy groups in its terminal and a molecular weight of 1,000 to 3,000, synthesized from a saturated diol having 2 to 6 carbon atoms and an organic dicarboxylic acid having 4 to 6 carbon atoms, with an organic diisocyanate in the molar ratio of NCO/OH of from 0.6/1 to 0.95/1;

(B) 10 to 60 parts by weight of a castor oil polyol;

(C) 1 to 100 parts by weight of an urethane prepolymer having isocyanate groups in its terminal obtained by the reaction of a low molecular polyol and an organic diisocyanate;

(D) 2 to 100 parts by weight of a fluoro resin; and (E) 5 to 100 parts by weight of a silicone oil.

2. A glass-run as claimed in claim 1, wherein said paint composition further comprises (F) 0.5 to 3 parts by weight of talc.

* * * * *